United States Patent
Gimat et al.

(10) Patent No.: US 10,508,559 B2
(45) Date of Patent: Dec. 17, 2019

(54) MONOBLOC PREFORM AND BLADE FOR TURBO MACHINE

(71) Applicants: SAFRAN AIRCRAFT ENGINES, Paris (FR); SAFRAN, Paris (FR)

(72) Inventors: Matthieu Gimat, Paris (FR); Dominique Marie Christian Coupe, Le Haillan (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 487 days.

(21) Appl. No.: 14/442,484

(22) PCT Filed: Nov. 12, 2013

(86) PCT No.: PCT/FR2013/052714
§ 371 (c)(1),
(2) Date: May 13, 2015

(87) PCT Pub. No.: WO2014/076408
PCT Pub. Date: May 22, 2014

(65) Prior Publication Data
US 2016/0245103 A1      Aug. 25, 2016

Related U.S. Application Data

(60) Provisional application No. 61/725,632, filed on Nov. 13, 2012, provisional application No. 61/856,878, filed on Jul. 22, 2013.

(51) Int. Cl.
*F01D 9/04* (2006.01)
*B29B 11/16* (2006.01)
(Continued)

(52) U.S. Cl.
CPC .............. *F01D 9/041* (2013.01); *B29B 11/16* (2013.01); *B29C 70/222* (2013.01);
(Continued)

(58) Field of Classification Search
CPC .......... F01D 5/282; F01D 9/041; F01D 25/24; F01D 25/005; F05D 2220/32;
(Continued)

(56) References Cited

U.S. PATENT DOCUMENTS 6,821,087 B2 * 11/2004 Matsumoto ............. F01D 5/282
                                                        415/191
7,581,932 B2      9/2009 Coupe et al.
(Continued)

FOREIGN PATENT DOCUMENTS

CN        102171025 A        8/2011
CN        102387908 A        3/2012
(Continued)

OTHER PUBLICATIONS

Office Action dated Sep. 26. 2017 in Japanese Application 2015-542333 (with English Translation).
(Continued)

*Primary Examiner* — Christopher Verdier
(74) *Attorney, Agent, or Firm* — Oblon, McClelland, Maier & Neustadt, L.L.P.

(57) ABSTRACT

A fiber preform for a turbine engine blade or vane obtained by single-piece three-dimensional weaving. The preform includes a first longitudinal segment suitable for forming a root; a second longitudinal segment extending the first longitudinal segment and suitable for forming an airfoil portion; and a first transverse segment extending transversely from the junction between the first and second longitudinal segments and suitable for forming a first platform.

10 Claims, 5 Drawing Sheets

(51) Int. Cl.
F01D 5/28 (2006.01)
B29C 70/22 (2006.01)
D03D 25/00 (2006.01)
F01D 25/00 (2006.01)
F01D 25/24 (2006.01)
B29L 31/08 (2006.01)

(52) U.S. Cl.
CPC ........... *D03D 25/005* (2013.01); *F01D 5/282* (2013.01); *F01D 25/005* (2013.01); *F01D 25/24* (2013.01); *B29L 2031/087* (2013.01); *F05D 2220/32* (2013.01); *F05D 2220/36* (2013.01); *F05D 2230/20* (2013.01); *F05D 2300/40* (2013.01); *F05D 2300/44* (2013.01); *F05D 2300/603* (2013.01); *F05D 2300/6012* (2013.01); *F05D 2300/6034* (2013.01); *Y02T 50/672* (2013.01)

(58) Field of Classification Search
CPC ............. F05D 2300/40; F05D 2300/44; F05D 2300/6012; F05D 2300/603; F05D 2300/6034; F05D 2300/614; F05D 2230/20; F05D 2220/36; D03D 25/005; Y02T 50/672; B29C 70/222; B29C 70/24; B29B 11/16
USPC .................. 415/200; 416/229 A, 230, 241 A
See application file for complete search history.

(56) References Cited

U.S. PATENT DOCUMENTS

| 2012/0055609 | A1 | 3/2012 | Blanchard et al. | |
| 2014/0356151 | A1* | 12/2014 | Fremont | F01D 5/282 |
| | | | | 415/200 |
| 2014/0369848 | A1* | 12/2014 | Marchal | B29C 70/24 |
| | | | | 416/230 |
| 2015/0040396 | A1* | 2/2015 | Fremont | B29B 11/16 |
| | | | | 29/889.71 |

FOREIGN PATENT DOCUMENTS

| CN | 103974824 A | 8/2014 |
| EP | 2 347 889 A1 | 7/2011 |
| FR | 2 943 942 | 10/2010 |
| FR | 2 961 845 A1 | 12/2011 |
| JP | 2012-522937 | 9/2012 |
| JP | 2012-522937 A | 9/2012 |
| JP | 2013-532257 | 8/2013 |
| JP | 2013-532257 A | 8/2013 |
| WO | WO 2011/088372 A1 | 7/2011 |
| WO | 2012-001276 | 1/2012 |
| WO | WO 2012/001278 A1 | 1/2012 |
| WO | 2012-121334 | 9/2012 |
| WO | WO 2012/121334 A1 | 9/2012 |
| WO | 2013 079859 | 6/2013 |
| WO | 2013 079860 | 6/2013 |
| WO | 2013 104852 | 7/2013 |

OTHER PUBLICATIONS

Office Action dated Sep. 26, 2017 in Japanese Patent Application No. 2015-542333 (submitting English language translation only).
International Search Report dated May 8, 2014 in PCT/FR2013/052714 Filed Nov. 12, 2013.
U.S. Appl. No. 14/442,577, filed May 13, 2015, Gimat et al.
English language translation of Combined Chinese Office Action and Search Report dated May 5, 2016 in Patent Application No. 201380067111.8.
Combined Russian Office Action and Search Report dated Nov. 1, 2017 in Patent Application No. 2015122679 (submitting English translation only).

\* cited by examiner

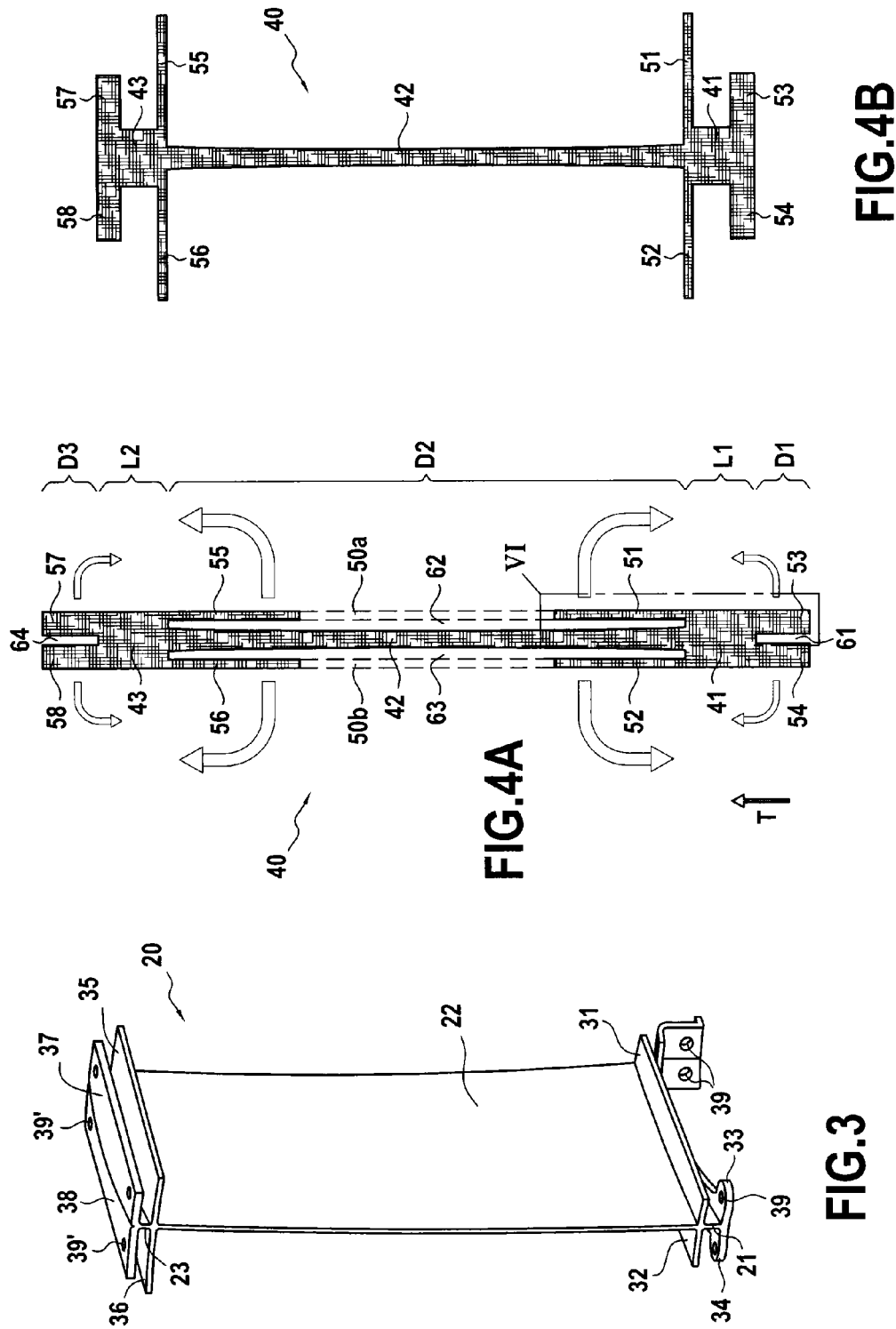

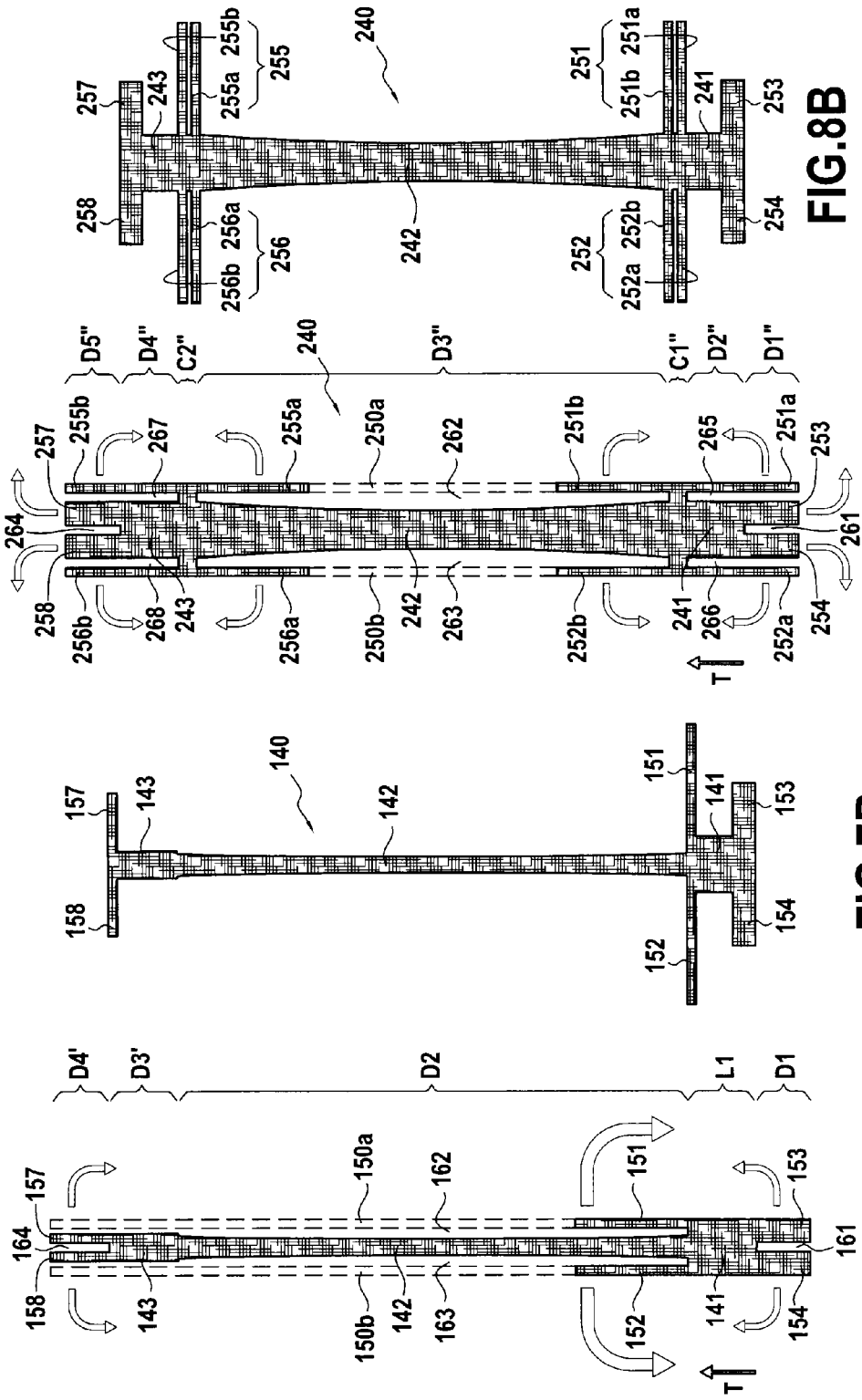

MONOBLOC PREFORM AND BLADE FOR TURBO MACHINE

FIELD OF THE INVENTION

The present specification relates to a fiber preform for a turbine engine vane or blade and also to a single-piece vane or blade formed using such a preform, to an intermediate casing, and to a turbine engine including such a vane or blade.

Such a preform may be used for making a single-piece vane or blade having aerodynamic platforms. Such vanes may in particular be guide vanes and they may be incorporated in the intermediate casing of an airplane turbojet, for example.

STATE OF THE PRIOR ART

A conventional bypass turbojet has a fan delivering a stream of air that is split into both a primary stream that is directed to the compressors, the combustion chamber, and then the turbines of the turbine engine, and also a secondary or bypass stream that delivers the major fraction of the thrust.

The secondary stream flows in a secondary passage provided between the outer casing of the jet and an inner casing containing the hot portion of the turbine engine. Those two casings are connected together and held in place by an intermediate casing made up of an inner hub, an outer shroud, and a plurality of structural arms extending radially and connecting the inner hub to the outer shroud. In addition to their structural function of supporting the loads that result from the dynamic behavior of the turbine engine as a whole, some of the structural arms are hollow, thereby enabling services to be passed such as fluid pipework, electric cables, or indeed members for transmitting mechanical power.

In addition, such a turbine engine includes a guide nozzle made up of a plurality of stationary vanes, commonly referred to as outlet guide vanes (OGVs) for the purpose of straightening out the secondary stream coming from the fan.

In order to reduce the weight of turbojets and the number of parts making them up, proposals have been made for intermediate casings that incorporate the nozzle function in which some of the structural arms are replaced by guide vanes. Nevertheless, such vanes need to be provided with additional elements, such as aerodynamic platforms or fastener flanges, which elements are fitted to the vane and significantly increase its overall weight, the number of parts involved (in particular because of the fasteners needed for fastening the elements to the vane), and the complexity of maintenance.

In order to improve some of the above-mentioned aspects, proposals have been made, in particular in French patent application FR 2 956 876, to design modules in the form of boxes made up of two composite vanes that are bolted to inner and outer platforms. Nevertheless, although the progress provided by that solution is already significant, such a solution still involves a large number of parts, in particular of fasteners, and it would be desirable to reduce that number in order to achieve further weight savings and also to save time during assembly and maintenance.

Such problems of reducing the weight or the number of parts used, of saving space, or of simplifying manufacturing methods are encountered not only with the guide vanes, but they are to be found more generally with all types of blade or vane in a turbojet, and more particularly with the fan blades.

There therefore exists a real need for a fiber preform, a vane, an intermediate casing, and a turbine engine that avoid the drawbacks inherent to the above-mentioned known systems.

SUMMARY OF THE INVENTION

The present specification relates to a fiber preform for a turbine engine blade or vane obtained by single-piece three-dimensional weaving, said preform comprising a first longitudinal segment suitable for forming a vane root; a second longitudinal segment extending the first longitudinal segment and suitable for forming an airfoil portion; and a first transverse segment extending transversely from the junction between the first and second longitudinal segments and suitable for forming a first platform.

In the present specification, the terms "longitudinal", "transverse", "bottom", "top", and their derivatives are defined relative to the main direction of the blade or vane in question; the terms "axial", "radial", "tangential", "inner", "outer", and their derivatives are defined relative to the main axis of the intermediate casing and of the turbine engine. Furthermore, the terms "upstream" and "downstream" are used herein relative to the direction of advance of the weaving (arrows T in the figures).

By means of this preform, it is possible to design a one-piece blade or vane made up of a vane root, an airfoil portion, and a platform: this one-piece design makes it possible to greatly reduce the number of parts that need to be designed and assembled together. In particular, there are considerable savings in fasteners, and thus in the weight and the cost associated therewith.

In addition, incorporating the platform in the design of the blade or vane itself gives rise to parts that are better optimized, not requiring extra thicknesses or additional parts for fastening the various elements of the blade or vane together. Such vanes are therefore lighter in weight and therefore provide significant savings in operation. Choosing to use composite materials also provides a significant saving in weight compared with like parts made out of metal or ceramic.

Naturally, the maintenance of such a single-piece blade or vane is also made easier since operations required for disassembly are reduced: in particular, it is possible to take action directly under the wing because the fasteners are less numerous and more accessible.

In certain embodiments, the preform further includes a second transverse segment extending transversely from the junction between the first and second longitudinal segments extending the first transverse segment and going away therefrom, suitable for forming a second platform. It is often advantageous to provide the blade or vane with a pressure-side platform and with a suction-side platform in order to provide an entire streamlined wall for the air-flow passage on either side of the blade or vane.

In certain embodiments, the first transverse segment is formed by at least a part of a free tail, said free tail and said second longitudinal segment being woven simultaneously in non-interlinked manner, the non-interlinking beginning at the junction between the first and second longitudinal segments.

Such non-interlinking provides the advantage of weaving the free tail corresponding to the transverse segment continuously with the first longitudinal segment, thereby structurally associating it therewith, the first longitudinal segment forming the blade or vane root that serves to support the blade or vane as a whole, while also taking thickness from downstream along the second longitudinal segment that is to form the airfoil portion, and that therefore needs to be finer. Such a boundary between the first and second longitudinal segments thus makes it possible to separate the weaving of the portion that is to become the structural portion from the portion that is to become the aerodynamic portion: the thickness transition required between those two portions is made much easier insofar as separating the free tail already provides a considerable contribution to this change of thickness.

In certain embodiments, the second transverse segment is made in analogous manner.

In other embodiments, the second transverse segment and said first longitudinal segment are woven jointly in non-interlinked manner, said non-interlinking terminating at the junction between the first and second longitudinal segments. Weaving in this way advantageously makes it possible to reduce the number of layers devoted to weaving the platforms, while conserving the layers needed for making the first transverse segment in the longitudinal segment.

In other embodiments, the first transverse segment is formed by at least parts of first and second free tails folded one on the other, said first free tail and said first longitudinal segment being woven simultaneously but in non-interlinked manner, said second free tail and said second longitudinal segment being woven simultaneously but in non-interlinked manner, a layer crossing being provided at the junction between the first and second longitudinal segments in such a manner that yarns of the first free tail extend in the second longitudinal segment and yarns of the second free tail come from the first longitudinal segment. The second transverse segment may be made in analogous manner.

In certain applications, it is desirable to have a vane root that is quite fine in order to enable it to be inserted in narrow spaces, for example, or an airfoil portion that retains a certain amount of thickness, e.g. in order to perform an additional structural role: under such circumstances, the thickness transition needed between the vane root and the airfoil portion, i.e. between the first and second longitudinal segments, may be small or even non-existent. Such layer crossing then advantageously serves to provide such thickness continuity between the first and second longitudinal segments.

In certain embodiments, the number of layers of yarns of the second longitudinal segment, and thus its thickness, varies. This makes it possible to make the airfoil portion finer so as to improve its aerodynamic performance.

In certain embodiments, the preform includes a third transverse segment and a fourth transverse segment extending transversely on either side of the upstream end of the first longitudinal segment and suitable for forming fastener flanges of the vane; said third and fourth transverse segments are woven simultaneously in non-interlinked manner, said non-interlinking terminating at the upstream end of the first longitudinal segment. By means of this preform, flanges are incorporated in the design and manufacture of the blade or vane that serve to fasten the blade or vane in the turbine engine: this amplifies the above-mentioned advantages. Furthermore, the flanges are woven directly to extend the root, so their structural connection therewith is reinforced, thereby ensuring increased overall mechanical strength.

In certain embodiments, the preform further comprises a third longitudinal segment extending the second longitudinal segment and suitable for forming a vane head; and a fifth transverse segment extending transversely from the junction between the second and third longitudinal segments and suitable for forming a third platform. Certain vanes are stationary and extend all the way across a fluid flow passage: under such circumstances, the outer wall of the passage may also need to have platforms placed therein. This preform serves to incorporate such a top platform likewise in the design and making of the vane: this amplifies the above-mentioned advantages.

In certain embodiments, the fifth transverse segment is obtained by non-interlinking analogous to that performed for the first transverse segment.

In other embodiments, the fifth transverse segment is obtained by layer crossing analogous to that performed for the first transverse segment.

In certain embodiments, the preform includes in analogous manner a sixth transverse segment suitable for forming the second top platform: this provides a pair of top platforms, one on the pressure side and the other on the suction side.

In certain embodiments, the preform includes seventh and eighth transverse segments analogous to the third and fourth transverse segments, and suitable for forming top flanges.

In certain embodiments, the yarns used for weaving the preform comprise carbon fibers. Nevertheless, they may be any other type of yarn, for example yarns comprising glass fibers or kevlar fibers.

In certain embodiments, the weave used for the three-dimensional weaving of the preform may be a 3D interlock type weave. Nevertheless, the weaving of the outside surfaces of the passage may be essentially two-dimensional, e.g. being woven with a satin type weave.

The present specification also relates to a turbine engine blade or vane, comprising a root, an airfoil portion, and a platform extending transversely from the airfoil portion at the junction between the vane root and the airfoil portion, said blade or vane being made as a single piece of composite material by means of a fiber preform according to any of the above embodiments, said preform being shaped in a mold and embedded in a matrix.

By means of this single-piece configuration incorporating at least one vane root, an airfoil portion, and a platform, the above-described advantages are obtained in terms of mechanical strength, weight, cost, suitability for dismantling, and ease of manufacture.

In certain embodiments, the matrix is of the organic type. In particular, it may be an epoxy resin.

In other embodiments, the matrix may be of the ceramic type.

The present invention also provides an intermediate casing for a turbine engine comprising a plurality of vanes according to any of the above-described embodiments that are disposed angularly between an inner hub and an outer shroud.

The present description also provides a turbine engine fan having a plurality of blades in accordance with any of the above-described embodiments.

Finally, the present specification relates to a turbine engine including at least one blade or vane or an intermediate casing or fan according to any of the above embodiments.

The above-specified characteristics and advantages, and others, appear on reading the following detailed description of embodiments of the proposed preform, of the blade or vane, of the intermediate casing, and of the turbine engine. This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are identified by the same reference signs. In addition, elements (or portions of an element) forming parts of different embodiments but having functions that are analogous are identified in the figures by numerical references that are incremented by 100, 200, etc.

FIG. 3 is a perspective view of a vane in a first embodiment.

FIGS. 4A and 4B are diagrams showing the preform corresponding to this first embodiment of a vane and how it is shaped.

FIGS. 7A and 7B are diagrams showing a second embodiment of a preform and how it is shaped.

FIGS. 8A and 8B are diagrams showing a third embodiment of a preform and how it is shaped.

DETAILED DESCRIPTION OF EMBODIMENTS

In order to make the invention more concrete, embodiments are described in detail below with reference to the accompanying drawings. It should be recalled that the invention is not limited to these embodiments.

Figure 1:
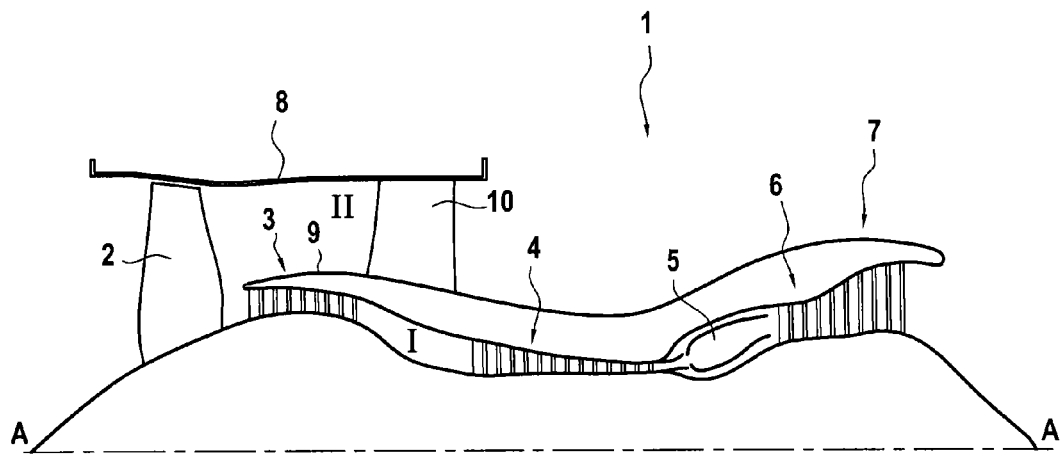
FIG. 1 is an elevation view in section of a turbine engine of the invention.

FIG. 1 is a section view on a vertical plane containing the main axis A of a bypass turbojet 1 of the invention. Going from upstream to downstream in the flow direction of the air stream it comprises: a fan 2; a low pressure compressor 3; a high pressure compressor 4; a combustion chamber 5; a high pressure turbine 6; and a low pressure turbine 7. In its upstream portion, this turbojet 1 has an outer casing 8 and an inner casing 9 defining two concentric passages, a primary passage I and a secondary passage II. An intermediate casing 10 connects the outer and inner casings 8 and 9 together.

In operation, the inner casing 9 splits the stream of air accelerated by the fan 2 both into a primary stream that takes the primary passage I and feeds the compressors 3, 4, the combustion chamber 5, and the turbines 6, 7, and also into a secondary stream that takes the secondary or "bypass" passage II from which it is ejected out of the turbojet, thereby delivering the major part of its thrust.

Figure 2:
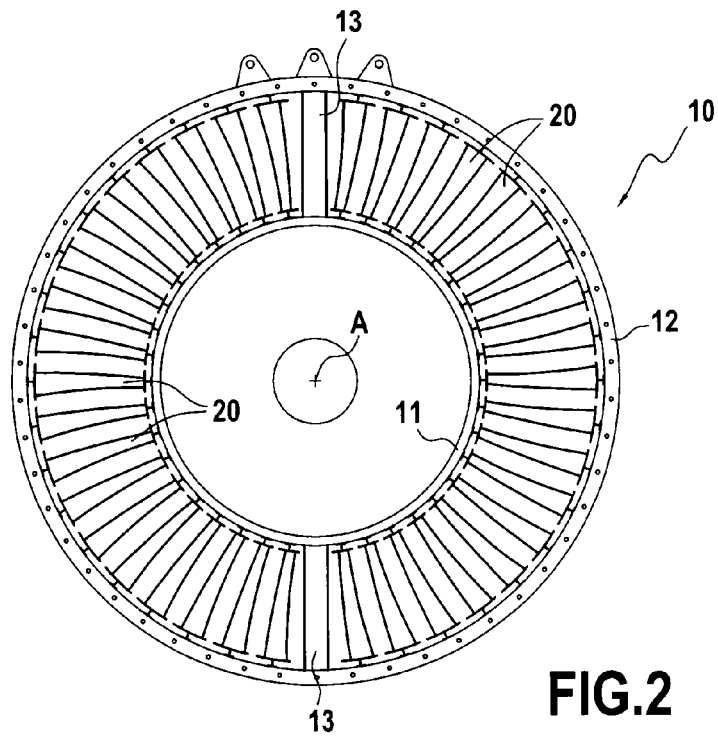
FIG. 2 is a front view of an intermediate casing in an embodiment.

FIG. 2 is a diagrammatic front view of such an intermediate casing 10. It comprises an inner hub 11 fastened to the inner casing 9 and an outer shroud 12 fastened in the outer casing 8. The inner hub 11 and the outer shroud 12 are connected together radially firstly by structural arms 13 and secondly by outlet guide vanes (OGVs) 20.

The structural arms 13 are hollow and serve to pass services between the core of the jet enclosed in the inner casing 9 and the periphery of the jet 1. Such services include in particular hydraulic pipework, pneumatic pipes, electric cables, and indeed mechanical power transmission shafts. These structural arms are preferably situated at 6 o'clock and at 12 o'clock relative to the axis A of the turbojet 1, i.e. in the vertical plane where most of the mechanical loads exerted by the weight of the turbojet 1 accumulate.

FIG. 3 shows a first embodiment of a nozzle vane 20 for such an intermediate casing 10. Such a vane 20 has a vane root 21, an airfoil portion 22, and a vane head 23. The airfoil portion 22 serves mainly to perform the aerodynamic function of the vane 20 whereas the vane root and head 21 and 23 serve mainly to fasten the vane 20 and hold it mechanically.

At its bottom end, the vane root 21 has bottom fastener flanges 33 and 34 extending substantially orthogonally to the vane root 21 and provided with holes 39 enabling the vane 20 to be fastened to the inner hub 11 of the intermediate casing 10.

At its top end, the vane head 23 has top fastener flanges 37 and 38 extending substantially orthogonally to the vane head 23 and provided with holes 39' enabling the vane 20 to be fastened to the outer shroud 12 of the intermediate casing 10.

The vane 20 also has pressure side and suction bottom platforms 31 and 32 extending substantially orthogonally to the airfoil portion 22, on either side thereof, at the boundary between the vane root 21 and the airfoil portion 22. These bottom platforms 31 and 32 serve to mask the fastener elements, in particular screws or bolts, used for fastening the bottom flanges 33, 34, and thus the vane 20, thereby reconstituting an inner wall for the passage II that is smooth and aerodynamic.

Likewise, the vane 20 has pressure side and suction side top platforms 35 and 36 extending substantially orthogonally to the airfoil portion 22, on either side thereof, at the boundary between the vane head 23 and the airfoil portion 22. These top platforms 35 and 36 serve to mask fastener elements, in particular screws or bolts, serving to fasten the top flanges 37 and 38, and thus the vane 20, thereby reconstituting an outer wall for the passage II that is smooth and aerodynamic.

In this embodiment, the vane 20 has four platforms 31, 32, 35, and 36, and four fastener flanges 33, 34, 37, and 38; nevertheless, in other examples, certain platforms and/or certain flanges could be absent in order to comply with certain specific local features of the intermediate casing 10 or in order to facilitate certain aspects of assembly and of maintenance.

Figure 6:
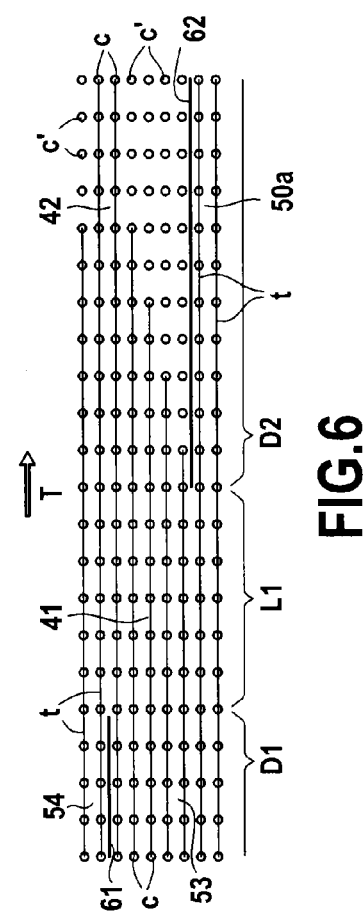
FIG. 6 is a fragmentary and diagrammatic view of the weaving of this preform, corresponding to box VI of FIG. 4A.

FIG. 4A shows the three-dimensionally (3D) woven preform 40 used for making this first vane embodiment 20. FIG. 4B shows the same preform 40 after it has been shaped. The preform 40 is described below from upstream to downstream in the weaving direction T, i.e. from the bottom to the top in the figures. Nevertheless, it should be understood that weaving could be performed from the other end and take place in the opposite direction. FIG. 6 also shows in diagrammatic manner the essential structures for weaving this preform 40 in box VI of FIG. 4A.

In this embodiment, the preform 40 is 3D woven out of carbon fibers using a 3D interlock weave. Only the surfaces of the preform 40 are two-dimensionally (2D) woven using a satin type weave.

At the upstream end, weaving begins with a first non-interlinked zone D1 in which third and fourth transverse segments 53 and 54 are woven simultaneously and in non-interlinked manner on opposite sides of a non-interlinked plane 61. It should be understood that the terms "transverse" and "longitudinal" are used herein as a function of the final position of the segment in question, the transverse segment necessarily being woven longitudinally prior to being folded transversely.

Downstream from the first non-interlinked zone D1, there begins a first interlinked zone L1 in which the two above strips 53 and 54 are united as a first longitudinal segment 41 that forms the root 21 of the vane 20.

Figure 5:
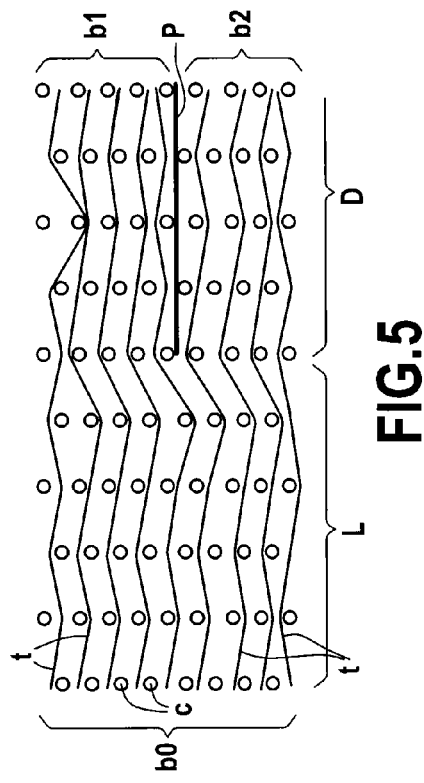
FIG. 5 is a simplified view of a non-interlinked zone.

Weaving methods that enable such non-interlinking to be performed are nowadays well known in the field of 3D weaving. By way of illustration, FIG. 5 shows such non-interlinked weaving in simplified manner. In the interlinked zone L, all of the layers of warp yarns c (orthogonal to the plane of the figure) are secured to one another by weft yarns t (moving in the plane of the figure), thereby forming a single strip b0. Conversely, in the non-interlinked zone D, two strips b1 and b2 are woven simultaneously but in non-interlinked manner, i.e. the weft yarns t are independent in each of the strips b1 and b2, such that a non-interlinked plane p is left between the two strips b1 and b2. Naturally, such interlinking may be performed equally well in the warp direction or in the weft direction, and thus equally well with warp strands and with weft strands.

Downstream from this first interlink zone L1, there begins a second non-interlinked zone D2 in which a first free tail 50a, a second longitudinal segment 42, and a second free tail 50b are woven simultaneously in non-interlinked manner being separated by respective non-interlinking planes 62 and 63.

In addition, within this second non-interlinked zone D2, layer exits are formed progressively along the weaving T between the second longitudinal segment 42 and each of the free tails 50a and 50b. These layers are subsequently progressively reincorporated before the downstream end of the second longitudinal segment 42.

Weaving methods that enable such layer exits to be performed are nowadays well known in the field of 3D weaving. Specifically, and as can be seen in FIG. 6, the weft yarns t are caused to leave certain warp yarns c' free, referred to as "float" yarns, because since they are unattached to any weft yarn t, they "float" and can subsequently be eliminated by shearing. It is possible in this way to eliminate layers completely or in part, thereby enabling the thickness of certain zones of the preform to be reduced. In this embodiment, this serves to make the second longitudinal segment 42 finer and thus to make finer the airfoil portion 22 that is derived therefrom.

It should be observed on this topic that these layer exits are formed in this embodiment inside the preform 40 while weaving is taking place: the floated warp yarns c' are thus enclosed, i.e. hidden, between the second longitudinal segment 42 on one side and the free tail 50a or 50b on the other side.

Downstream from this second non-interlinked zone D2, the three above-mentioned strips 50a, 42, and 50b are reunited within a second interlinked zone L2 so as to form a third longitudinal segment 43 that is to form the head 23 of the vane 20.

Finally, downstream from this second interlinked zone L2, there begins a third non-interlinked zone L3 in which seventh and eighth transverse segments are woven simultaneously in non-interlinked manner so as to present a non-interlinked plane 64.

Once weaving has been terminated, the free tails 50a and 50b are cut away so as to form respectively first and fifth transverse tails 51 and 55, and second and sixth transverse tails 52 and 56. These four transverse tails 51, 55, 52, and 56 are then folded outwards as represented by the arrows so as to occupy their final transverse positions: they are used for forming respectively the pressure side and suction side bottom platforms 31 and 32, and the pressure side and suction side top platforms 35 and 36.

Once the free tails 50a and 50b have been cut away, the floated warp yarns c' lying at the surface of the second longitudinal segment 42 become accessible can be sheared.

Finally, the third, fourth, seventh, and eighth transverse segments 53, 54, 57, and 58 are folded outwards as represented by the arrows so as to occupy their final transverse positions: they are used respectively for forming the bottom flanges 33 and 34 and the top flanges 37 and 38. Such a final configuration for the preform 40 is shown in FIG. 4B.

The preform 40 may be moistened in order to make it more flexible and make it easier to frame the fibers. The preform is then inserted into a forming mold of inside space that matches the desired configuration for the preform 40.

The preform 40 is then dried so as to become stiff, thereby locking the configuration imposed during shaping. The preform 40 is finally placed in an injection mold having the dimensions desired for the final vane 20, and a matrix is injected therein, in this embodiment an epoxy resin. By way of example, such injection may be performed by the resin transfer molding (RTM) technique. At the end of this step, a composite material vane 20 is obtained that is made up of a woven preform 40 of carbon fibers embedded in an epoxy matrix. Machining stages may optionally be used to finish off the technique and finalize the vane 20.

FIG. 7A shows a second embodiment of a 3D woven preform 140 for making a second vane embodiment that is entirely analogous to with the first vane embodiment 20 except that it does not have any top platforms. FIG. 7B shows the same preform 140 after it has been shaped.

The weaving of this preform 140 is to a large extent analogous to that of the first embodiment and is therefore not described in full once more.

Thus, going from upstream to downstream in the weaving direction T, the weaving begins with a first non-interlinked zone D1, a first interlinked zone L1, and a second non-interlinked zone D2 analogous to those of the first embodiment. In contrast, the second non-interlinked zone D2 is extended by a third non-interlinked zone D3' in which the non-interlinked weaving of the free tails 150a and 150b is continued while a third longitudinal segment 143 extends the second longitudinal passage 142. Consequently, the third longitudinal segment 143 is naturally not as thick as in the first embodiment. It is possible to compensate this effect by using thickness-transition techniques that are well known in the field of 3D weaving.

Finally, downstream from this third non-interlinked zone D3', a fourth non-interlinked zone D4' begins in which the non-interlinked weaving of the free tails 150a and 150b is continued while the strip derived from the third longitudinal segment 143 is split in a manner analogous to that of the first embodiment so as to form the seventh and eighth transverse segments 157 and 158.

The shaping of this second preform embodiment 140 and the method of forming the final vane are likewise analogous to those of the first embodiment. The final configuration of the preform 140 is shown in FIG. 7B.

FIG. 8A shows a third embodiment of a 3D woven preform 240 suitable for making a vane analogous to the first vane embodiment 20. FIG. 8B shows the same preform 240 after shaping. This preform 240 shares a large number of characteristics with the first preform embodiment 40: these characteristics are not described again. The preform 240 is described from upstream to downstream in the weaving direction T, i.e. from the bottom towards the top in the figures. Nevertheless, it should be understood that weaving could be performed from the other end and in the opposite direction.

At the upstream end, weaving begins with a first non-interlinked zone D1" in which a first free tail 251a of the first transverse segment 251, the third transverse segment 253, the fourth transverse segment 254, and a first free tail 252a of the second transverse segment 252 are all woven together in non-interlinked manner with respective non-interlinking planes 265, 261, and 266.

Downstream from the first non-interlinked zone D1", there begins a second non-interlinked zone D2" in which the non-interlinked weaving of the first free tails 251a, 252a of the first and second transverse segments 251 and 252 continues, while the strips derived from the third and fourth transverse segments 253 and 254 are united in a first longitudinal segment 241 that is to form the root 21 of the vane 20.

Downstream from this second non-interlinking zone D2", a first layer crossing zone C1" forms an interface with a third non-interlinked zone D3" in which a first free tail 250a, a second longitudinal segment 222, and a second free tail 250b are woven simultaneously in non-interlinked manner together with corresponding non-interlinking planes 262 and 263.

At the first layer crossing zone C1", layers are crossed in such a manner that the layers of yarns from the first free tails 251a and 252a of the first and second transverse segments 251 and 252 extend towards the second longitudinal segment 242, while the layers of yarns making up the free tails 250a and 250b are derived from the first longitudinal segment 241.

Figure 9A:
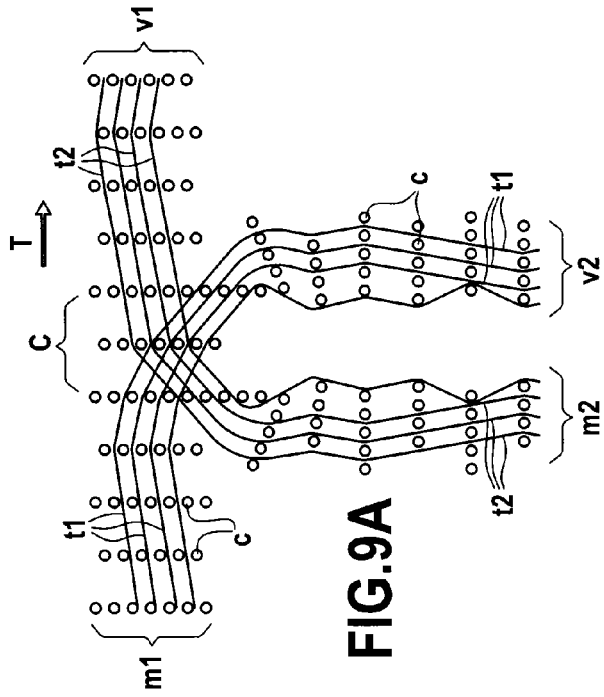
FIGS. 9A and 9B are simplified diagrams of layers crossing.

Weaving methods enabling layers to be crossed in this way are nowadays well known in the field of 3D weaving. By way of illustration, FIG. 9A is a simplified diagram of such a layer crossing. In the layer crossing zone C, the weft yarns t1 holding together the layers of warp yarns c in an upstream top strip m1 are diverted downwards in order to be secured downstream from the layer crossing zone C with the layers of warp yarns c of a downstream bottom strip v2, while the weft yarns t2 securing the layers of an upstream bottom strip m2 are diverted upwards in order to secure together the layers of a downstream top strip v1. Thus, the weft yarns t1 and t2 cross in the layer crossing zone C. When associated with the non-interlinking technique, this layer crossing technique makes it possible to weave two tails m2 and v2 that are not interlinked so that they extend each other while ensuring that they are securely attached to the main sheet m1, v1.

Figure 9B:
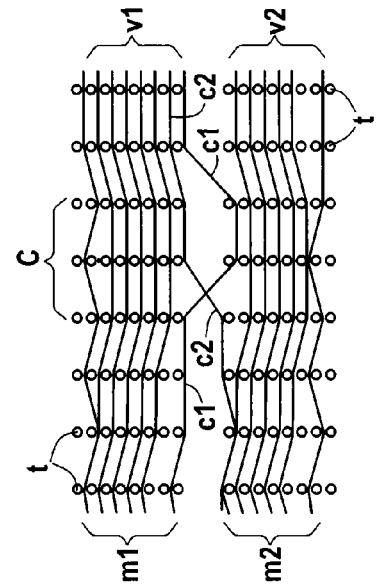

In the preceding example, a plurality of yarns t1 and t2 of each layer are involved in the layer crossing; however, in other examples as the one of FIG. 9B, an only yarn c1, c2 of each layer may be involved in the layer crossing. This other example also illustrates that a layer crossing may be performed equally well with warp yarns c1, c2 and with weft yarns t1, t2.

Returning to FIGS. 8A and 8B and to the weaving of preform 240, within the third non-interlinked zone D3", layer exits are formed progressively along the weaving T between the second longitudinal segment 242 and each of three tails 250a and 250b. These layers are subsequently progressively reincorporated before the downstream end of the second longitudinal segment 242.

Downstream from this third non-interlinked zone D3", a second layer crossing zone C2" forms an interface with a fourth non-interlinked zone D4" in which a second free tail 255b of the fifth transverse segment 255, the third longitudinal segment 243, and a second free tail 256b of the sixth transverse segment 256 are woven simultaneously in non-interlinked manner, with respective non-interlinking planes 267, 264, and 268.

In the second layer crossing zone C2", the layers cross so that the layers of yarns from the free tails 250a and 250b are extended towards the third longitudinal segment 243 while the layers of yarns making up the second free tails 255b, 256b of the first and second transverse segments 255, 256 come from the second longitudinal segment 242.

Finally, downstream from the fourth non-interlinked zone D4", there begins a fifth non-interlinked zone D5" in which the non-interlinked weaving of the second free tails 255b, 256b of the first and second transverse segments 255, 256 continues while the strip coming from the third longitudinal segment 243 splits in a manner analogous to the first embodiment in order to form the seventh and eighth transverse segments 257 and 258.

Once the weaving has terminated, the free tails 250a and 250b are cut off so as to form respectively the second free tail 251b of the first transverse segment 251 and the first free tail 255a of the fifth transverse segment 255, and also the second free tail 252b of the second transverse segment 252 and the first free tail 256a of the sixth transverse passage 256.

The first and second free tails of each of the transverse segments 251, 252, 255, and 256 are then folded towards one another as shown by the arrows so as to take up their final transverse positions. Adhesive or stitching may be provided between each of the first and second free tails. The transverse segments 251, 252, 255, and 256 respectively form the pressure side and suction bottom platforms 31 and 32 and the pressure side and suction side top platforms 35 and 36 of the vane 20.

Once the free tails 250a and 250b have been cut away, the float yarns c' that exist at the surface of the second longitudinal segment 242 become available and can be sheared.

Finally, the third, fourth, seventh, and eighth transverse segments 253, 254, 257, and 258 are folded outwards as shown by the arrows so as to occupy their final transverse positions: they form respectively the bottom flanges 33 and 34 and the top flanges 37 and 38.

Such a final configuration for the preform 240 is shown in FIG. 8B. The method of forming the vane 20 from this preform 240 is analogous to that of the first embodiment.

Figure 10A:
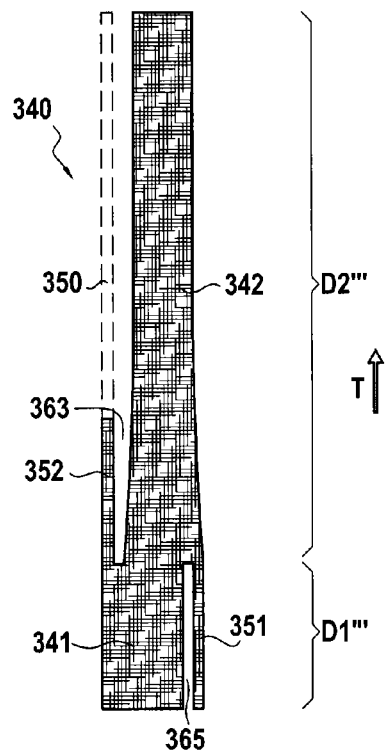
FIGS. 10A and 10B are diagrams showing a fourth embodiment of a preform and how it is shaped.
Figure 10B:
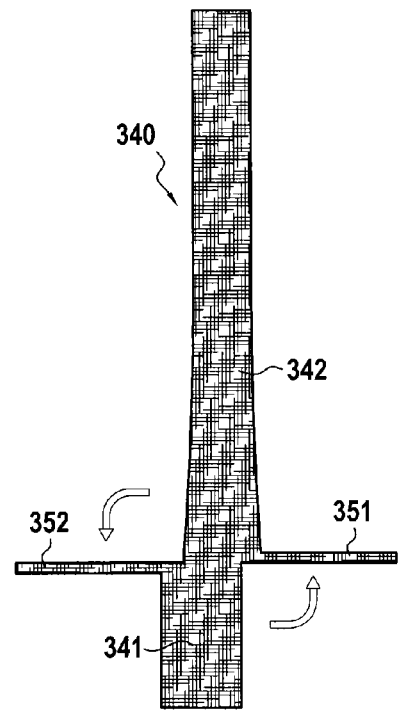

FIG. 10A shows a fourth embodiment of a three-dimensionally woven preform 340 that enables a fourth embodiment of a blade to be made. Unlike the first three embodiments described above, this fourth embodiment does not represent a guide vane of the intermediate casing, but rather a blade of the fan 2. Nevertheless, the above-described weaving method can equally well be adapted to other types of blade and also to other types of vane. Under such circumstances, it is possible for example to provide fastener flanges in a manner analogous to any one of the first three embodiments. FIG. 10B shows the same preform 340 after it has been shaped.

The weaving of this preform 340 is largely analogous to that of the first embodiment and it is therefore not described again in full. The main difference lies in the use of non-interlinking in a "relay" configuration making it possible to devote only N layers of weaving to the platforms, whereas 2N layers are needed in the above embodiments.

Thus, from upstream to downstream in the weaving direction T, the weaving begins with a first non-interlinked zone D1''' in which the first transverse segment 351 and the first longitudinal segment 341 are woven jointly in non-interlinked manner with a non-interlinked plane 365 between them. During weaving, the first transverse segment 351 thus extends along a first side of the first longitudinal segment 341, the right-hand side in the figure.

Downstream from the first non-interlinked zone D1''', there begins a second non-interlinked zone D2''' in which a free tail 350 and a second longitudinal segment 342 are woven jointly in non-interlinked manner with a non-interlinked plane 363 between them. In this second non-interlinked zone D2''', the free tail 350 thus extends along the second side of the second longitudinal segment 342, i.e. the side opposite from the first transverse segment 351, on the left in the figure. Thus, the layers of the first transverse segment 351 are extended in the second longitudinal segment 342, while the layers of the free tail 350 are taken from the first longitudinal segment 341.

Once weaving has been completed, the second transverse segment 352 is obtained by cutting the free tail 350 in a manner analogous to the above embodiments, in which the second transverse segment 352 and the first longitudinal segment 341 are woven jointly in non-interlinked manner with the non-interlinked plane 365 between them, and the non-interlinked plane 365 is closer to a free end of the first longitudinal segment 341 than the non-interlinked plane 363 in a longitudinal direction of the preform. Under such circumstances, the first transverse segment 351 and the second transverse segment 352 are folded outwards along the arrows in FIG. 10B so as to occupy their final transverse positions: they form respectively the pressure-side and the suction-side platforms of the blade.

Other aspects of the shaping of this fourth embodiment of a preform 340 and the method of forming the final blade are likewise analogous to the shaping and the forming described above. The final configuration of the preform 340 is shown in FIG. 10B. Since this preform 340 is for use in making a fan blade, it can be seen that it does not have a third longitudinal segment and that it does not have third and fourth transverse segments.

Figure 11A:
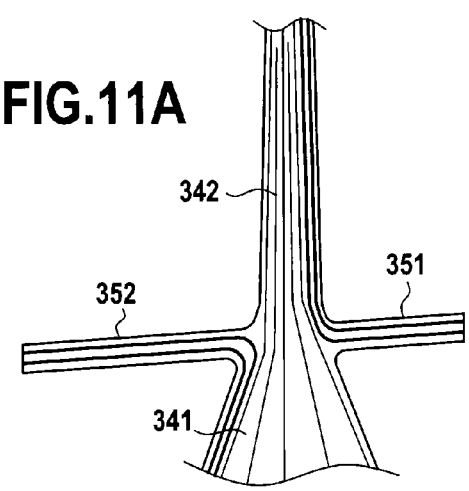
FIGS. 11A and 11B are diagrams showing possible organizations of layers in the fourth embodiment of a preform.

Various layer transitions may be provided at the interface between the non-interlinked zones D1''' and D2'''. In a first configuration shown in FIG. 11A, these are simple non-interlinking in which the layers of the first transverse segment 351 are extended linearly into the second longitudinal segment 342 in order to form the outermost layers thereof; likewise, the layers of the free tail 350 are taken linearly from the outermost layers of the first longitudinal segment 341.

It may be observed at this point that the first longitudinal segment 341 may be given considerable thickness close to its bottom end and it may then be made thinner going towards the second longitudinal segment 342, in particular by making use of layer exits. This enables the blade root that is to be made using this first longitudinal segment 341 to be given a dovetail shape enabling it to be mounted in the slots of a fan disk, while also ensuring that the airfoil that is derived from the second longitudinal segment 342 is suitably thin.

Figure 11B:
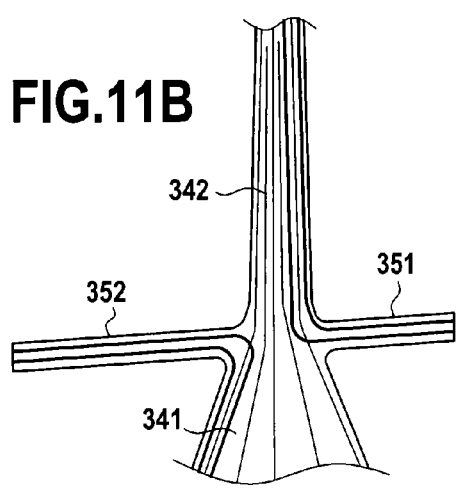

FIG. 11B shows a variant in which layer crossings are provided at the interface between the non-interlinked zones D1''' and D2'''. In such a variant, it is no longer only the outermost strands of the first longitudinal segment 341 or of the second longitudinal segment 342 respectively that are used for forming the second transverse segment 352 or the first transverse segment 351 respectively: some of the strands of these transverse segments 351, 352 in this example are taken from layers closer to the cores of the longitudinal segments 341, 342. The use of such crossing weaves provides better attenuation of the unbalance that can be generated by the non-interlinking D1''' and D2''' in a relay configuration: the transition at platform level is thus made smoother.

A specific advantage of this fourth embodiment is to reduce the number of layers devoted to weaving the platforms. If each platform possesses N layers, only one N-layer thickness is needed in addition to the layers of the longitudinal segments for the purpose of weaving both platforms, whereas two times N layers are needed in the first three embodiments, i.e. N layers on each of the two sides.

A first advantage that stems directly from this reduction in the number of layers is the possibility of using a loom in a configuration that is simpler, or of making blades or vanes that are thicker or that are more complex.

In addition, the thickness transition at the interface between the root and the airfoil is smaller, and that is favorable.

Finally, this weaving technique gives rise to less scrap, thereby naturally reducing production costs: in this fourth embodiment, only one free tail needs to be cut, unlike two free tails in the other embodiments.

The embodiments described above in the present description are given by way of non-limiting illustration, and in the light of this description a person skilled in the art can easily modify these embodiments or can envisage others, while remaining within the scope of the invention.

Furthermore, the various characteristics of these embodiments may be used on their own or in combination. When they are combined, these characteristics may be combined as described above, or otherwise, the invention not being limited to the specific combinations described in the present specification. In particular, unless specified to the contrary, any characteristic described with reference to any one embodiment may be applied in analogous manner to any other embodiment.

The invention claimed is:

1. A fiber preform for a turbine engine blade or vane, the preform obtained by single-piece three-dimensional weaving, comprising:
    a first longitudinal segment suitable for forming a root;
    a second longitudinal segment extending the first longitudinal segment and suitable for forming an airfoil portion;
    a first transverse segment extending transversely from a junction between the first and second longitudinal segments and suitable for forming a first platform; and
    a second transverse segment extending transversely from the junction between the first and second longitudinal segments extending the first transverse segment and going away therefrom, suitable for forming a second platform;
    wherein the first transverse segment is formed by at least a portion of a free tail, said free tail and said second longitudinal segment being woven jointly in non-interlinked manner, said non-interlinking beginning at the junction between the first and second longitudinal segments; and
    wherein the second transverse segment and said first longitudinal segment are woven jointly in non-interlinked manner, said non-interlinking terminating at the junction between the first and second longitudinal segments.

2. The fiber preform according to claim 1, wherein a number of layers of yarns, and thus the thickness, of the second longitudinal segment varies.

3. A blade or vane for a turbine engine, the blade or vane comprising:
- a root;
- an airfoil portion; and
- a platform extending transversely from the airfoil at a junction between the root and the airfoil portion;
- said blade or vane being made as a single piece of composite material by means of the fiber preform according to claim 1, said preform being shaped in a mold and embedded in a matrix.

4. An intermediate casing for the turbine engine, the casing comprising a plurality of vanes according to claim 3 arranged angularly between an inner hub and an outer shroud.

5. The turbine engine, comprising at least one intermediate casing according to claim 4.

6. A turbine engine fan, comprising a plurality of blades according to claim 3.

7. A turbine engine, comprising at least one fan according to claim 6.

8. The turbine engine, comprising at least one blade or vane according to claim 3.

9. The blade or vane according to claim 3, wherein said matrix comprises an organic material.

10. The fiber preform according to claim 1, wherein the free tail and the second longitudinal segment are woven jointly in non-interlinked manner with a first non-interlinked plane therebetween, and
- wherein the second transverse segment and the first longitudinal segment are woven jointly in non-interlinked manner with a second non-interlinked plane therebetween, the second non-interlinked plane is being closer to a free end of the first longitudinal segment than the first non-interlinked plane in a longitudinal direction of the fiber preform.

* * * * *